United States Patent
Peltolehto et al.

(10) Patent No.: US 6,359,787 B1
(45) Date of Patent: Mar. 19, 2002

(54) ELECTRONIC APPARATUS WITH FLOATING PRINTED CIRCUIT BOARD

(75) Inventors: Ari Peltolehto, Oulu (FI); Maja Lund; Peter Gorm Christensen, both of Copenhagen (DK); Hannu Hyytiainen, Oulu (FI); Kim Sulkakoski, Oulu (FI); Jari Viitala, Oulu (FI); Axel Wagner, Copenhagen (DK)

(73) Assignee: Nokia Mobile Phones, Oulu (FI)

( * ) Notice: Subject to any disclaimer, the term of this patent is extended or adjusted under 35 U.S.C. 154(b) by 0 days.

(21) Appl. No.: 09/489,263

(22) Filed: Jan. 21, 2000

(51) Int. Cl.[7] .................................................. H05K 5/00
(52) U.S. Cl. ..................... 361/752; 361/818; 455/575; 379/429; 379/440; 379/451
(58) Field of Search .......................... 361/818; 362/248, 362/227; 379/429–457; 455/575; 312/223.4, 223.1

(56) References Cited

U.S. PATENT DOCUMENTS 5,150,282 A * 9/1992 Tomura et al. ............. 361/424
5,675,397 A * 10/1997 Fukushima ................. 349/149

* cited by examiner

*Primary Examiner*—Jeffrey Gaffin
*Assistant Examiner*—Thanh Y. Tran
(74) *Attorney, Agent, or Firm*—Perman & Green, LLP

(57) ABSTRACT

Portable electronic apparatus such as a radio telephone includes an outer housing containing electronic components for its operation. A printed circuit board assembly including, for example, a printed circuit board and an accompanying protective shield member, is mounted on supports integral with the interior structure of the outer housing so as to be physically spaced from the outer housing and from the electronic components contained within the outer housing. Resilient cushion members in the form of resilient or rubber-like pads are interposed between the printed circuit board assembly and the supports thereby substantially isolating the printed circuit board from the effect of a physical shock to the outer housing, as would occur if the apparatus were dropped. More specifically, wherein the resilient cushion members firmly engage the printed circuit board at a plurality of spaced locations engaged, variously, with the upper surface, with the lower surface, and with the peripheral edge.

10 Claims, 6 Drawing Sheets

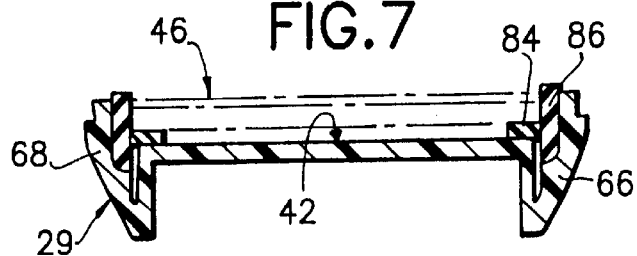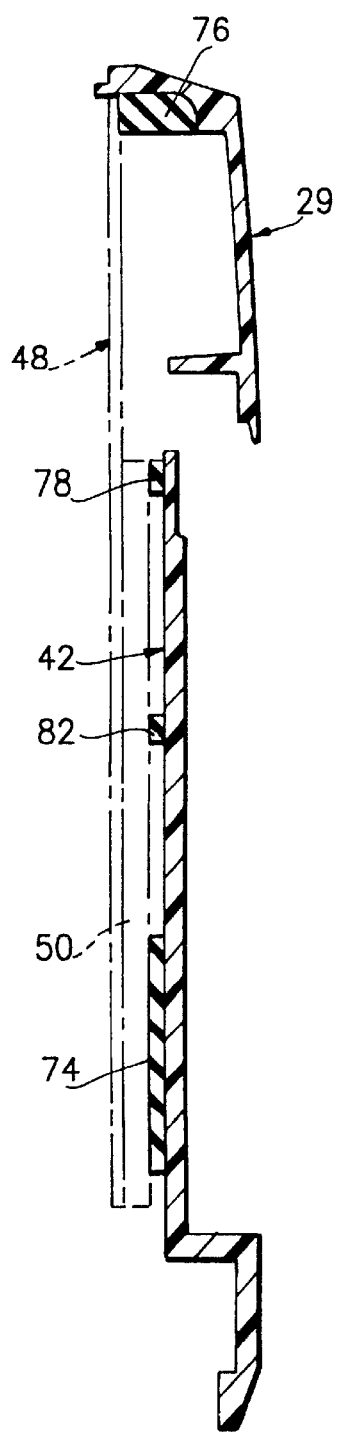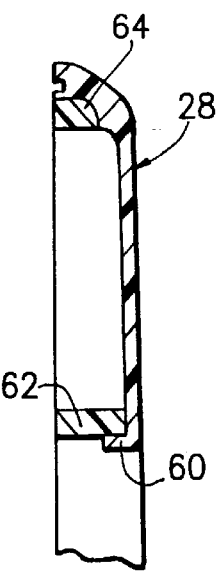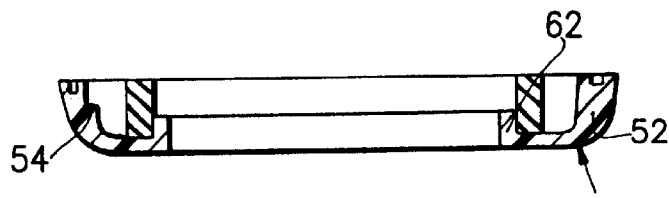

ELECTRONIC APPARATUS WITH FLOATING PRINTED CIRCUIT BOARD

BACKGROUND OF THE INVENTION

1. Field of the Invention

The present invention relates to portable electronic apparatus and, more particularly, to electronic apparatus in the form of radio telephones so constructed as to isolate an internal printed circuit board from physical shocks caused, for example, by dropping.

2. Prior Art

Portable electronic apparatus customarily employs printed circuit boards (PCBs) on which are mounted fragile electronic components, for example, microchip components. In most known situations, the PCBs are mounted directly on the hard plastic covers which comprise the outer housing or casing of the electronic apparatus. Mobile telephones, and especially those of the radio telephone variety, are especially susceptible to being dropped and the resulting mechanical shock when they strike the floor or ground often critically harms these electronic components and often renders the electronic apparatus unusable. Not only the shock is deleterious to the components. Another effect is that the PCB is caused to bend which may result in a loosening of the electronic components from their underlying substrate and breakage of the soldered connections.

SUMMARY OF THE INVENTION

The present invention relates to portable electronic apparatus such as a radio telephone which includes an outer housing containing electronic components for its operation. A printed circuit board assembly including, for example, a printed circuit board and an accompanying protective shield member, is mounted on supports integral with the interior structure of the outer housing so as to be physically spaced from the outer housing and from the electronic components contained within the outer housing. Resilient cushion members in the form of resilient or rubber-like pads are interposed between the printed circuit board assembly and the supports thereby substantially isolating the printed circuit board from the effect of a physical shock to the outer housing, as would occur if the apparatus were dropped. More specifically, wherein the resilient cushion members firmly engage the printed circuit board at a plurality of spaced locations engaged, variously, with the upper surface, with the lower surface, and with the peripheral edge.

A primary feature, then, of the present invention is the provision of portable electronic apparatus constructed as to isolate an internal printed circuit board from physical shocks caused, for example, by dropping.

Another feature of the present invention is the provision of such apparatus being in the form of a portable telephone.

Still another feature of the present invention is the provision of such apparatus being in the form of a radio telephone.

Yet another feature of the present invention is the provision of such apparatus in which the PCB is resiliently supported within the housing for the telephone so as to be cushioned against adverse movement, including bending, in all three directions of a common three axis orthogonal coordinate system.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and together with the description, serve to explain the principles of the invention in general terms. Like numerals refer to like parts throughout the disclosure.

BRIEF DESCRIPTION OF THE DRAWINGS

The foregoing aspects and other features of the present invention are explained in the following description, taken in connection with the accompanying drawings, wherein:

FIG. 5 is a cross section view generally taken along line 5—5 in FIG. 4;

FIG. 6 is a cross section view generally taken along line 6—6 in FIG. 4;

FIG. 7 is a cross section view generally taken along line 7—7 in FIG. 3; and

FIG. 8 is a cross section view generally taken along line 8—8 in FIG. 3.

DETAILED DESCRIPTION OF THE PREFERRED EMBODIMENT

Figure 1:
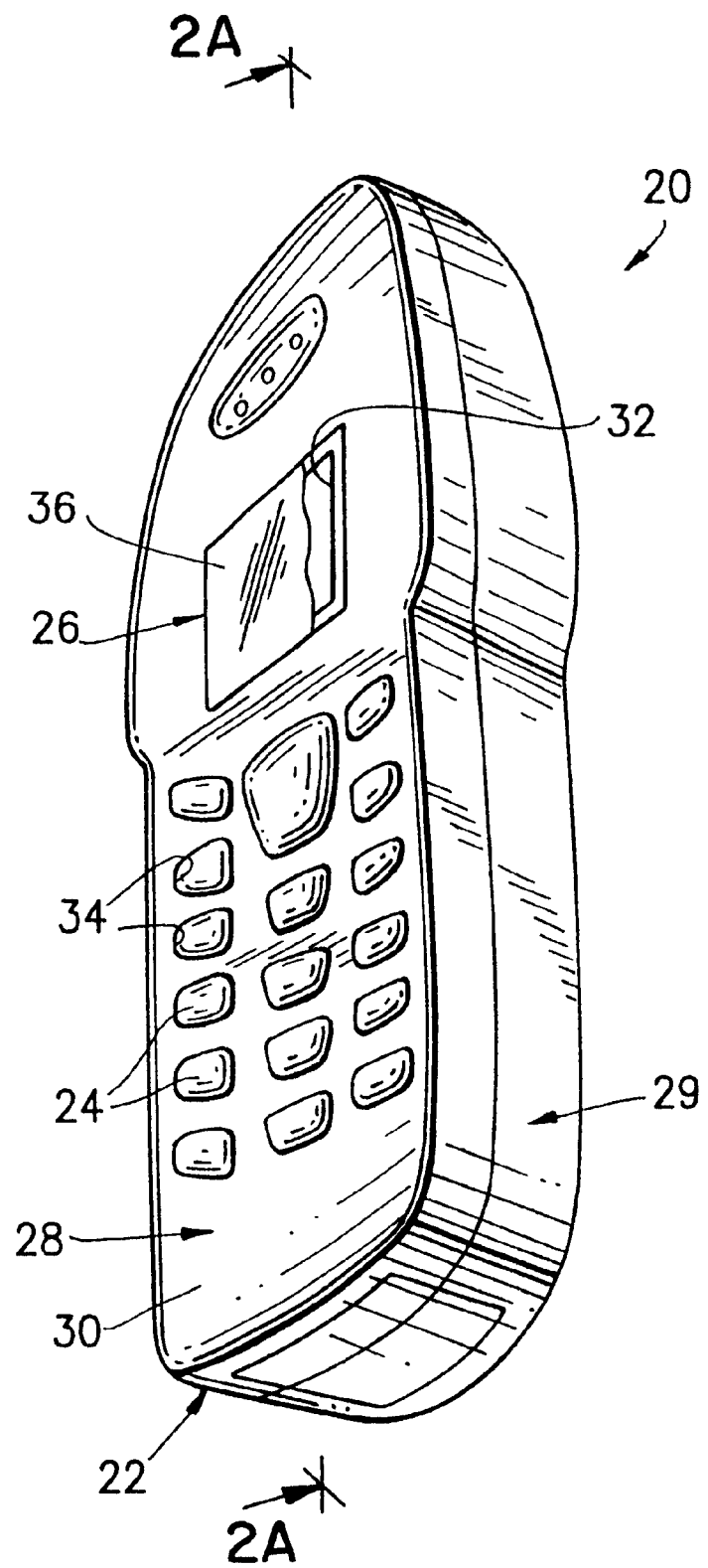
FIG. 1 is a perspective view of electronic apparatus, in the form of a radio telephone, embodying the invention.

Referring initially to FIG. 1, there is shown a perspective view of portable electronic apparatus in the form of a radio telephone 20 incorporating features of the present invention. Although the present invention will be described with reference to the single embodiment shown in the drawings, it should be understood that the present invention can be embodied in many alternate forms of embodiments. In addition, any suitable size, shape or type of elements or materials could be used.

In a customary fashion, the telephone 20 includes a housing 22 containing all of the functional components which enable communications to take place. These functional components include, among numerous others, a plurality of operating buttons 24 for the operation of the telephone and an indicia panel 26 for displaying information concerning operation of the telephone. An upper cover 28 of the housing 22 is coextensive with and overlies a lower cover 29 to which it is removably attachable so as to complete closure, in conjunction with the lower cover, of the components within the housing. The cover 28 includes an outer face 30 having a primary opening 32 for viewing the indicia panel 26 and a plurality of secondary openings 34 for free reception therethrough of the operating buttons 24. A transparent window member 36 which may be of plastic, glass, or other suitable transparent material and properly curved overlies and protects the indicia panel 26. In FIG. 2A, a battery 37 is illustrated supported within the lower cover 29.

Figure 2:
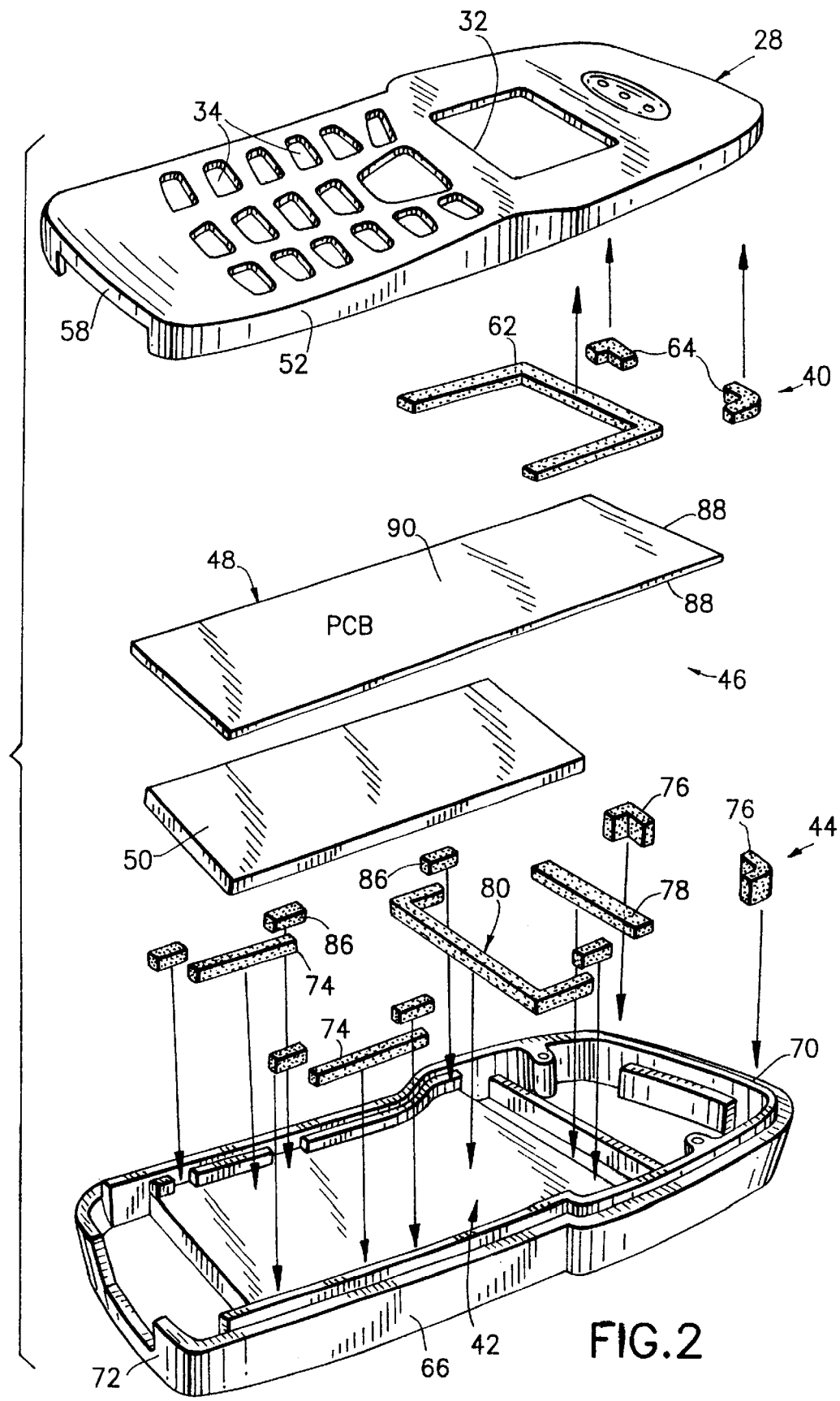
FIG. 2 is an exploded perspective view of the radio telephone illustrated in FIG. 1.
Figure 2A:
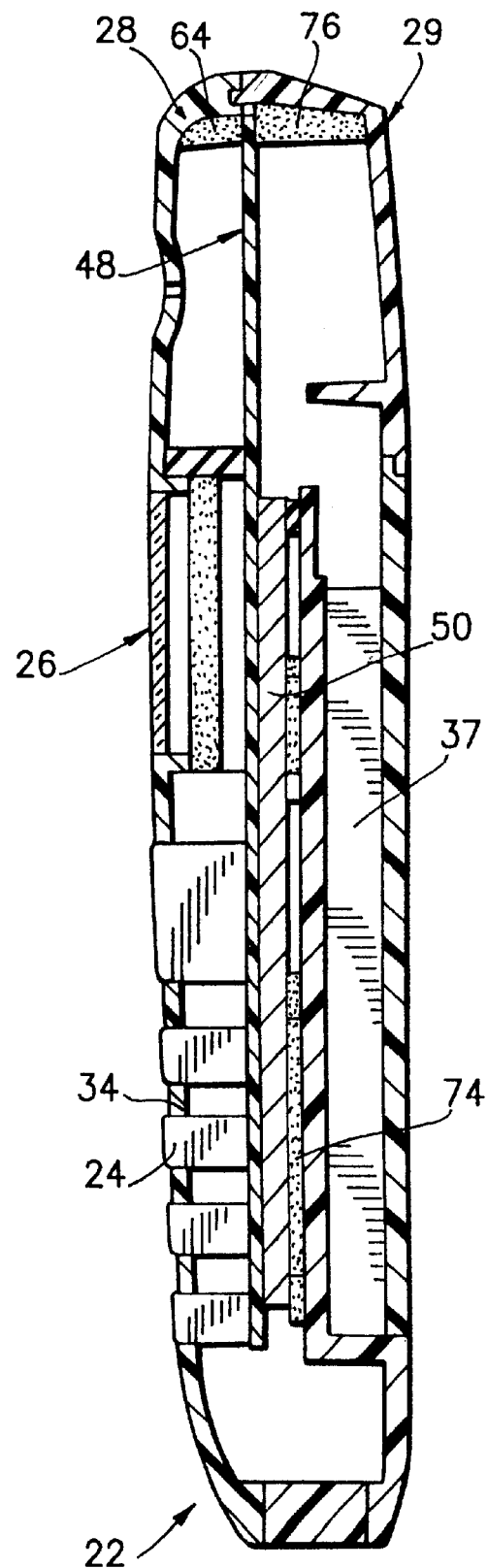
FIG. 2A is a longitudinal cross section view through the radio telephone illustrated in FIGS. 1 and 2.
Figure 3:
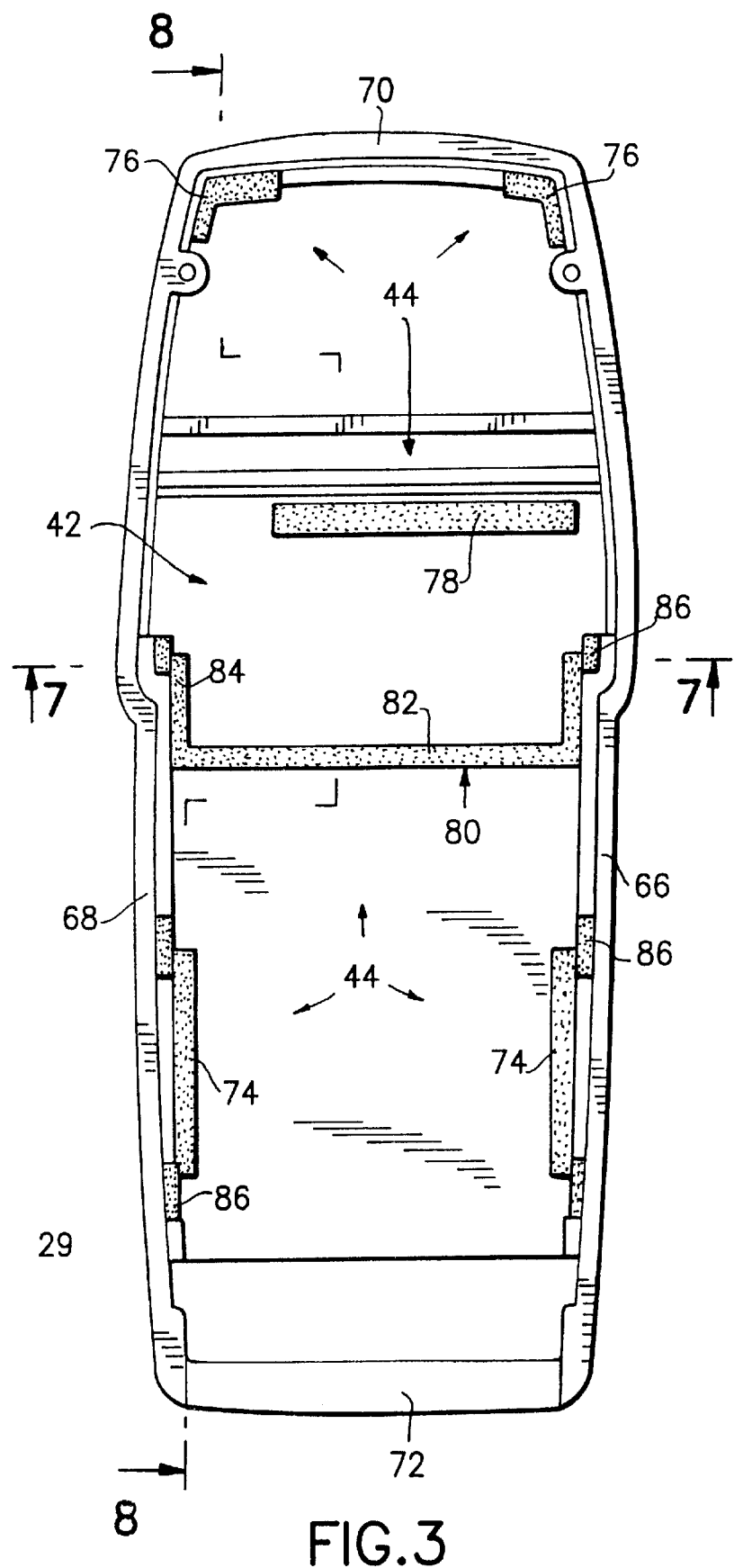
FIG. 3 is a top plan view of the lower cover illustrated in FIGS. 1 and 2.
Figure 4:
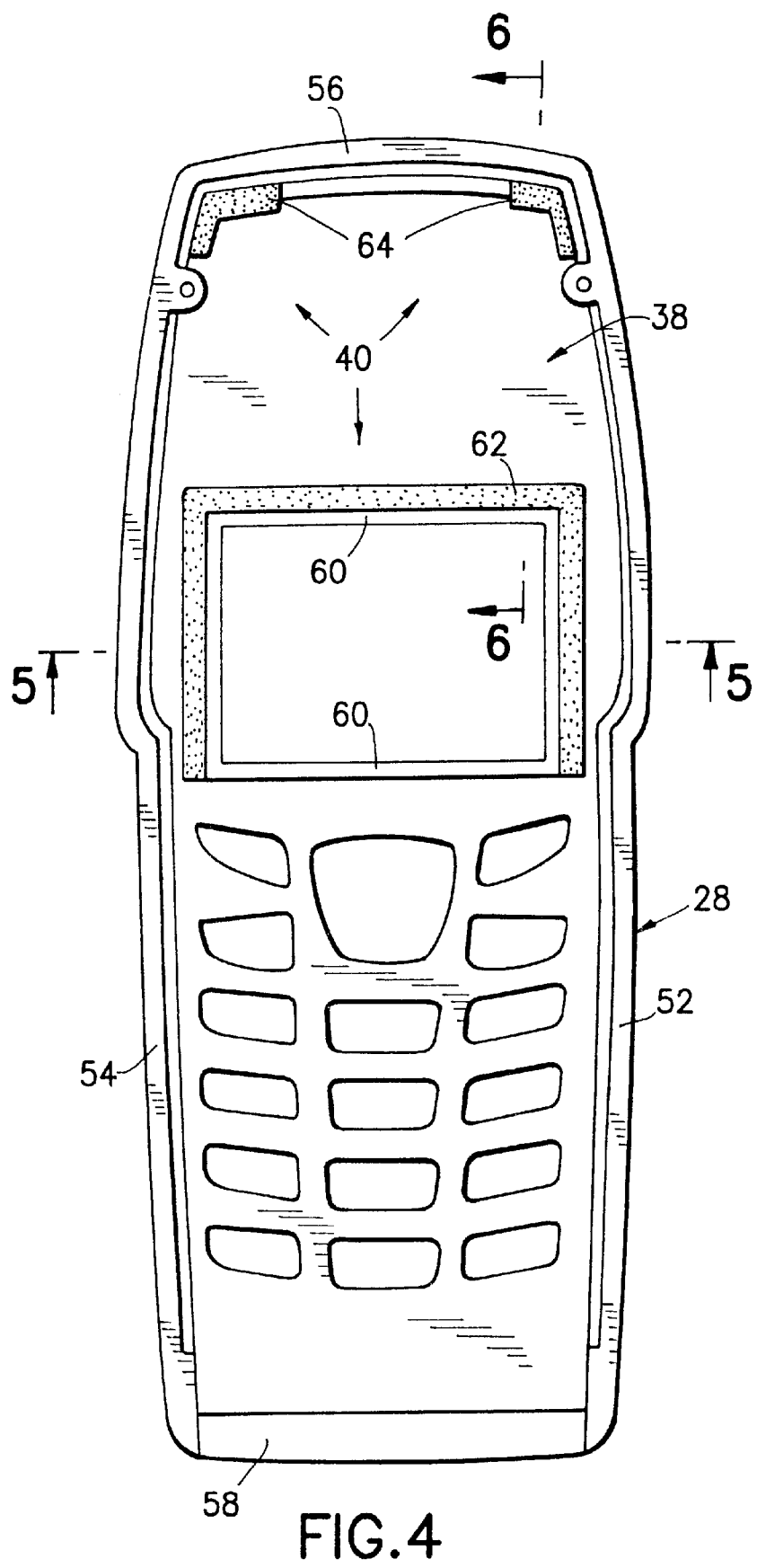
FIG. 4 is a top plan view of the upper cover illustrated in FIGS. 1 and 2.

Turning now to FIGS. 2, 3, and 4, the upper cover 28 has integral inner supporting surfaces 38 (FIG. 4) for engageably receiving resilient cushion members 40 which will be more specifically described below. In similar fashion, the lower cover 29 has integral inner surfaces 42 (FIGS. 2 and 3) for engageably receiving resilient cushion members 44 which will also be more specifically described below. The resilient cushion members 40, 44 may be rubber or of any other suitable resilient material and will henceforth in this disclosure be referred to, on occasion, as being rubber-like. Further, they may be attached to the inner supporting surfaces 38, 42 in any suitable manner. One suitable technique is to use the known two-shot molding technique commonly used when two different kinds of materials are molded together. This emerging technology produces a part with two different raw materials or colors in a single operation. The machine has two injection units. By using a rotating mold, the machine automatically produces a substrate of one resin or color and overmolds the part with the second resin or color.

In a manner also to be described below, a printed circuit board assembly 46, which may be taken in the customary manner to be a printed circuit board 48 and its associated protective shield member 50, is supported on the resilient cushion members in such a manner as to be physically spaced from the covers 28, 29 of the outer housing 22 and from the other components contained within the outer housing. With the resilient cushion members 40, 44 interposed between the printed circuit board assembly 46 and the inner supporting surfaces 38, 42 of the upper and lower covers 28, 29, respectively, the printed circuit board 48 is substantially isolated from the effect of a physical shock to the outer housing in all three direction of a common three axis orthogonal coordinate system.

Now viewing especially FIGS. 2, 4, 5, and 6, the upper cover 28 is seen to have opposed side walls 52, 54 and end walls 56, 58 upstanding from the integral inner supporting surfaces 38. The primary opening 32 for viewing the indicia panel 26, earlier mentioned, extends from the outer face 30 to the inner supporting surface 38, and an upstanding rim 60 encircles the primary opening. The resilient cushion members 40 include different-shaped rubber-like pad members which are appropriate to their placement within the housing 22. In this regard, an elongated generally U-shaped pad member 62 has a depth substantially greater than that of the upstanding rim 60. The pad member 62 is mounted to the inner supporting surface 38 of the upper cover 28 and proximately encircles, generally, the upstanding rim 60. Additionally, a pair of rubber-like pad members 64 are mounted to the inner supporting surface 38 of the upper cover 28 proximate the intersections, respectively, of the side walls 52, 56 and the end wall 56.

In similar fashion, viewing especially FIGS. 2, 3, 7, and 8, the lower cover 29 is seen to have opposed side walls 66, 68 and end walls 70, 72 upstanding from the integral inner supporting surfaces 42. As in the instance of the upper cover 28, the resilient cushion members 44 include different-shaped rubber-like pad members which are appropriate to their placement within the housing 22. In this regard, at least one elongated rubber-like pad member 74 is mounted to the inner supporting surface 42 of the lower cover adjacent each side wall 66 and 68. Additionally, a plurality of rubber-like corner pad members 76 are mounted to the inner supporting surface 42 of the lower cover 29 proximate the intersections, respectively, of the side walls 66, 68 and end wall 70. Further, at least a pair of elongated rubber-like pad members 78, 80 are mounted to the inner supporting surface of the lower cover at longitudinally (that is, between the end walls 70, 72) spaced locations. In each instance, the pad members 78, 80 extend transversely of the side walls 66, 68 although pad member 80 is really U-shaped with a transverse or bight portion 82 connecting a pair of longitudinally extending leg portions 84 which lie proximate the side walls 66, 68, respectively. Finally, a plurality of longitudinally spaced rubber-like pad members 86 are mounted to the side walls 66, 68 of the lower cover 29 so as to be generally coplanar with the printed circuit board 48 and firmly engaged with a peripheral edge 88 of the printed circuit board.

With the novel construction then, just described, the resilient cushion members 40, 44 firmly engage the printed circuit board 48 at a plurality of spaced on its upper surface 90, lower surface 92, and with the peripheral edge 88. With the printed circuit board 48 or the printed circuit board assembly 46 so restrained, when the telephone 20 is dropped onto an underlying surface, all shocks are passed to the printed circuit board through the rubber-like pads which are thus shock absorbers for the printed circuit board. The printed circuit board is not screwed or in any other way fastened to the covers 28, 29 of the housing 22, the only attachment being by way of the tight fit with the resilient cushion members 40, 44. Indeed, the invention provides an arrangement whereby the printed circuit board 48 or assembly 46 actually floats within the housing 22.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. Portable electronic apparatus comprising:

an outer housing containing electronic components for operation of the electronic apparatus;

support means within the outer housing and integral therewith;

a printed circuit board assembly supported on the support means so as to be physically spaced from the outer housing and from the electronic components contained within the outer housing; and resilient cushion means interposed between the printed circuit board assembly and the support means for isolating the printed circuit board from the effect of a physical shock to the outer housing in all three directions of a common three axis orthogonal coordinate system.

2. Portable electronic apparatus as set forth in claim 1 wherein the portable electronic apparatus is a telephone.

3. Portable electronic apparatus as set forth in claim 1 wherein the portable electronic apparatus is a radio telephone.

4. Portable electronic apparatus as set forth in claim 1 wherein the printed circuit board assembly includes:

a printed circuit board; and a protective shield member.

5. Portable electronic apparatus as set forth in claim 1 wherein the printed circuit board has an upper surface, a lower surface, and a peripheral edge;

wherein the resilient cushion means includes a plurality of rubber-like pad members which firmly engage the printed circuit board at a plurality of spaced locations engaged, variously, with the upper surface, with the lower surface, and with the peripheral edge.

6. Portable electronic apparatus as set forth in claim 1 wherein the outer housing includes:
   an upper cover having an outer face with a primary opening for viewing an indicia panel and a plurality of secondary openings for free reception therethrough of operating buttons for the telephone; and
   a lower cover supporting the electronic components, a battery, and the printed circuit board assembly.

7. Portable electronic apparatus as set forth in claim 6 including a transparent window member mounted on the upper cover protectively overlying the indicia panel.

8. Portable electronic apparatus as set forth in claim 1
   wherein the upper cover has integral inner surfaces for engageably receiving the resilient cushion means thereon;
   wherein the lower cover has integral inner surfaces for engageably receiving the resilient cushion means thereon; and
   wherein the printed circuit board is spaced from the upper cover and from the lower cover and is firmly sandwiched between the resilient cushion means of the upper cover and the resilient cushion means of the lower cover.

9. Portable electronic apparatus as set forth in claim 8
   wherein the upper cover has opposed side walls and end walls upstanding from the integral inner surfaces, a primary opening extending from an outer face to an inner surface for viewing an indicia panel, and an upstanding rim encircling the primary opening;
   wherein the resilient cushion means include:
      an elongated rubber-like pad member having a depth substantially greater than that of the upstanding rim mounted to the inner surface of the upper cover and proximately encircling the upstanding rim; and
      a plurality of rubber-like pad members mounted to the inner surface of the upper cover proximate the intersections, respectively, of the side walls and end walls.

10. Portable electronic apparatus as set forth in claim 8
    wherein the lower cover has opposed side walls and end walls upstanding from the integral inner surfaces; and
    wherein the resilient cushion means include:
       at least one elongated rubber-like pad member mounted to the inner surface of the lower cover adjacent each side wall;
       a plurality of rubber-like corner members mounted to the inner surface of the lower cover proximate the intersections, respectively, of the side walls and end walls;
       at least a pair of elongated rubber-like pad members mounted to the inner surface of the lower cover at longitudinally spaced locations and extending transversely of the side walls; and
       a plurality of longitudinally spaced rubber-like pad members mounted to the side walls of the lower cover generally coplanar with the printed circuit board and firmly engaged with the peripheral edge of the printed circuit board.

* * * * *